(12) United States Patent
Okajima

(10) Patent No.: US 6,256,781 B1
(45) Date of Patent: Jul. 3, 2001

(54) EXTERNAL RESET AND DATA TRANSFER METHOD AND APPARATUS FOR A PORTABLE ELECTRONIC DEVICE

(75) Inventor: Yoshio Okajima, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 07/871,768

(22) Filed: Apr. 21, 1992

(30) Foreign Application Priority Data

Apr. 26, 1991 (JP) .................................... 3-097640

(51) Int. Cl.$^7$ ..................................................... G06F 9/44
(52) U.S. Cl. ................................................................ 717/8
(58) Field of Search .................................. 395/650, 700, 395/800; 364/709.16, 706; 455/186.2, 89

(56) References Cited

U.S. PATENT DOCUMENTS

| | | | | |
|---|---|---|---|---|
| 3,823,388 | * | 7/1974 | Chadima, Jr. et al. | 340/172.5 |
| 4,037,092 | * | 7/1977 | Osborne et al. | 235/156 |
| 4,053,753 | * | 10/1977 | Sado et al. | 364/709 |
| 4,090,247 | * | 5/1978 | Martin | 364/900 |
| 4,291,385 | * | 9/1981 | Osborne et al. | 364/709 |
| 4,301,511 | * | 11/1981 | Shimizu et al. | 364/709 |
| 4,384,328 | * | 5/1983 | Watson et al. | 364/200 |
| 4,530,068 | * | 7/1985 | Nakanishi et al. | 364/900 |
| 4,608,629 | * | 8/1986 | Nagel | 364/200 |
| 4,839,854 | * | 6/1989 | Sakami et al. | 364/900 |
| 4,930,065 | * | 5/1990 | McLagan et al. | 364/200 |
| 4,984,295 | * | 1/1991 | Engstrom et al. | 455/186 |
| 5,065,360 | * | 11/1991 | Kelly | 395/800 |
| 5,136,694 | * | 8/1992 | Bett et al. | 395/275 |
| 5,175,869 | * | 12/1992 | Murata | 455/66 |

FOREIGN PATENT DOCUMENTS

| | | |
|---|---|---|
| 2-281367 | 11/1990 | (JP) . |
| 3-44751 | 2/1991 | (JP) . |

OTHER PUBLICATIONS

"Understanding and Using Microcomputers" by Zimmerman et al 1986, pp. 34–39.*

Patrick G. McKeown, "Living with Computers", 1988, pp. 33–35.*

* cited by examiner

Primary Examiner—Mark R. Powell
Assistant Examiner—Todd D. Ingberg
(74) Attorney, Agent, or Firm—Nixon & Vanderhye P.C.

(57) ABSTRACT

A portable terminal device which can transfer data stored in a RAM to an external device even when any fault occurs in a key input portion or any abnormality occurs in part of the data stored in the RAM is provided. The CPU of the device controls a detection process to detect the state of a prescribed portion of the device and also controls a determination process to determine whether or not the data is to be transferred to the external device based on the detected result. When the CPU determines to transfer the data to the external device, the CPU controls the execution of a read process to read out the data stored in the RAM and a transfer process to transfer the data via a communication port thereof to the external device such as another portable terminal device.

15 Claims, 5 Drawing Sheets

EXTERNAL RESET AND DATA TRANSFER METHOD AND APPARATUS FOR A PORTABLE ELECTRONIC DEVICE

BACKGROUND OF THE INVENTION

1. Field of the Invention

The present invention relates to a portable terminal device such as an electronic pocket organizer.

2. Description of the Prior Art

In an electronic pocket organizer, data entered by an operator using a keyboard is usually stored in a RAM, which makes it possible to utilize the data. For example, the operator can see the contents of the data, because the electronic pocket organizer can read the data from the RAM and display the read-out data on a display area.

One example of such an electronic pocket organizer has a function for transferring valuable data stored in the RAM to an external device such as another electronic pocket organizer, when a transfer command is input. FIG. 5 is a flowchart illustrating the control procedure for a data transfer process of a CPU in a conventional electronic pocket organizer. When the operator depresses the keys (step S10), the CPU judges in step S11 whether the key input indicates the transfer command or not. If Yes, the CPU reads out the data stored in the RAM and the read-out data is transferred to the external device in step S12. If No, the process proceeds to step S13 in which the CPU executes another process such as a data display process or a data storing process.

However, in the above-mentioned transfer system, when a fault occurs in the key input portion due to short circuit or the like, the operator cannot input the transfer command for transferring data to the external device. In the transfer system, the CPU checks whether the data is normal or not prior to the execution of the transfer program, and when the data is determined to be abnormal, the CPU does not execute the transfer program. Therefore, when a fault occurs in the key input portion, or when an abnormality occurs in part of the data stored in the RAM (for example, when the data is improperly rewritten due to run away), the data is not available, and moreover the data cannot be transferred to the external device. This means that the valuable data which has been input by the operator is wasted.

SUMMARY OF THE INVENTION

A portable terminal device of this invention comprises a RAM for storing data, a ROM for storing a transfer program for transferring at least part of the data stored in the RAM to an external device, a CPU for controlling the execution of the transfer program, and a reset switch for initializing a prescribed area in the RAM. The CPU controls a detection process to detect the state of a prescribed portion of the portable terminal device when the reset switch is turned on. The CPU also controls a determination process to determine whether or not the transfer program is to be executed based on the detected state.

In accordance with another embodiment, a method of transferring data is provided for a portable terminal device including a RAM for storing data, a ROM for storing a transfer program to transfer at least part of the data stored in the RAM to an external device, a CPU for controlling the execution of the transfer program, and a reset switch for initializing a prescribed area in the RAM. The method includes a first step of detecting the state of a prescribed portion of the portable terminal device when the reset switch is turned on. The method also includes a second step of determining whether or not the transfer program is to be executed based on the detected state.

In accordance with one exemplary embodiment, when the reset switch is turned on, the CPU detects the connection state with the external device. If the external device is connected with the portable terminal device, the CPU determines to transfer data to the external device. As a result, the data stored in the RAM can be directly transferred to the external device regardless of the key operation or data quality to be transferred.

Thus, the invention described herein makes possible the objective of providing a portable terminal device which can transfer data stored in the RAM to an external device, even when a fault occurs in the key input portion, or an abnormality occurs in part of the data stored in the RAM.

BRIEF DESCRIPTION OF THE DRAWINGS

This invention may be better understood and its numerous objects and advantages may become apparent to those skilled in the art by reference to the accompanying drawings.

DESCRIPTION OF THE PREFERRED EMBODIMENTS

Figure 1:
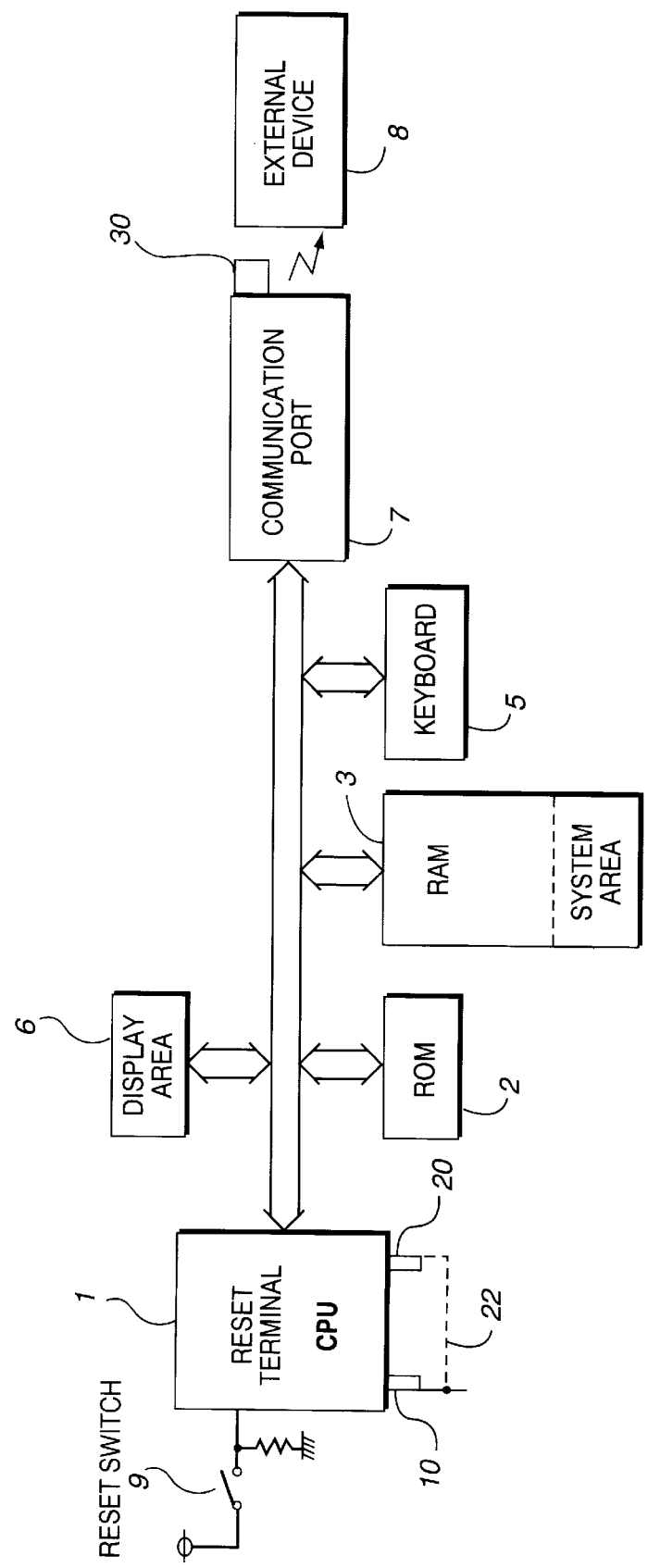
FIG. 1 is a block diagram showing the circuitry of an electronic pocket organizer according to the invention.

FIG. 1 shows a block diagram of the circuitry of an electronic pocket organizer according to the invention. A CPU 1 serves as the control center of the electronic pocket organizer and controls various processes such as a transfer process which is described below in accordance with a transfer control program stored in a ROM 2. A RAM 3 includes a system area for storing stack pointers, etc. necessary for executing various program and a data area for storing data input from a keyboard 5. When prescribed data is input to the CPU 1 from the keyboard 5 by an operator, the CPU 1 controls a write process to write the data into the data area of the RAM 3.

On a liquid crystal display area 6, the data stored in the data area of the RAM 3 is displayed. More specifically, when the operator operates the keyboard 5 so as to send a display command to the CPU 1, the CPU 1 controls a read process to read the data stored in the RAM 3, and a display process to drive the display area 6 and display the read-out data. When the CPU 1 executes the transfer program, the data stored in the RAM 3 is transferred to an external device 8 such as another electronic pocket organizer which is connected to the electronic pocket organizer via a communication port 7. A reset switch 9 is provided in order to initialize the system area in the RAM 3.

Figure 2:
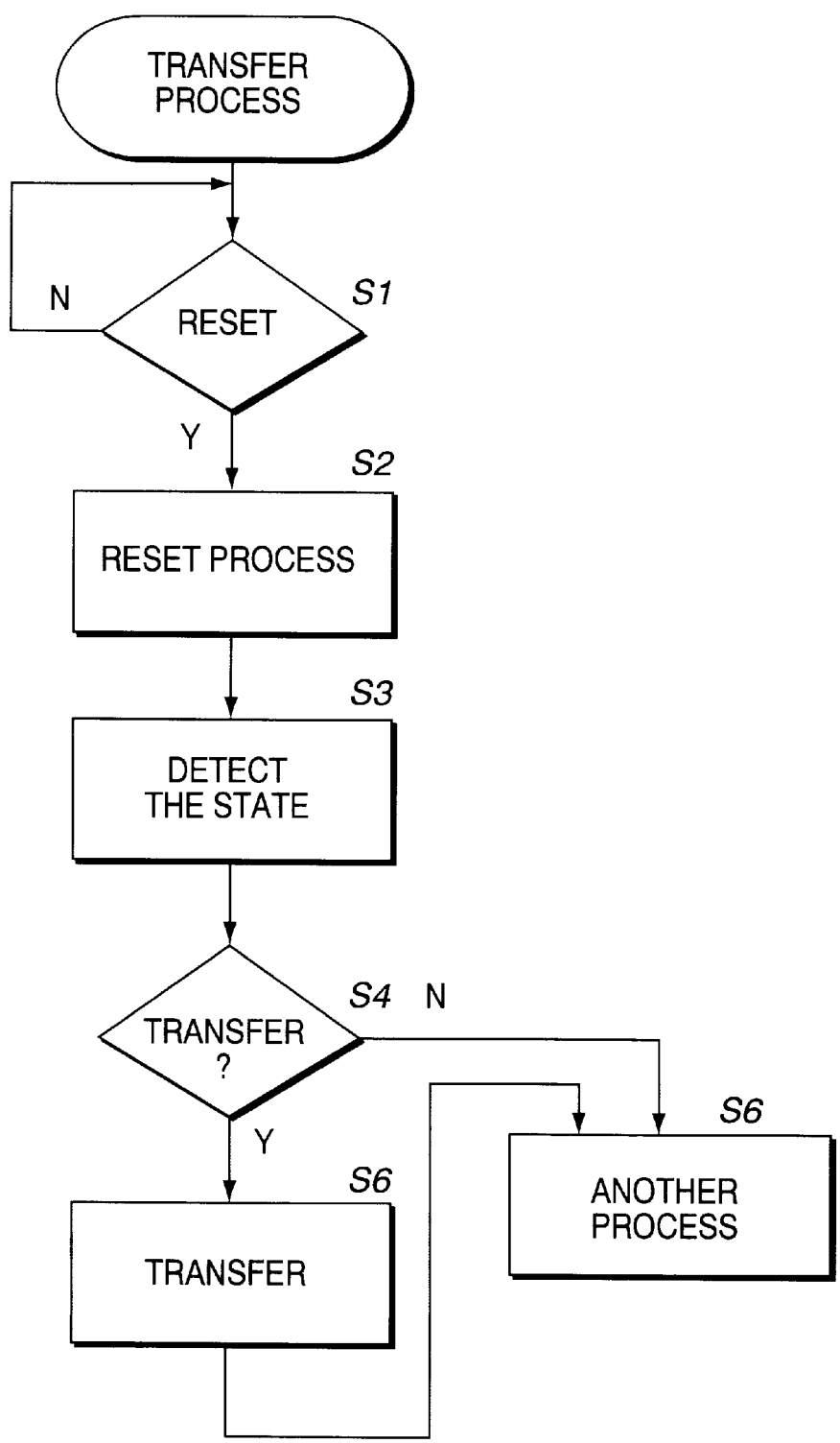
FIG. 2 is a flowchart illustrating a control procedure for a transfer process of the CPU.

FIG. 2 shows the control procedure for the transfer process of the CPU 1 according to the invention. When the reset switch 9 is turned on (step S1), the CPU 1 controls a reset process to initialize the system area in the RAM 3 (step S2). Then, in step S3, the CPU 1 detects the state of a prescribed portion of the electronic pocket organizer. In step S4, based on the state detected in step S3, the CPU 1 determines whether the data is to be transmitted to the external device B or not (in other words, whether the transfer program is to be executed or not).

Steps S3 and S4 are described in more detail. A case is described where the prescribed portion of the electronic pocket organizer whose state is detected in step S3 is a specific terminal 10 of the CPU 1 (e.g., a specific input pin). When the CPU 1 detects in step S3 that a high level voltage is supplied to the terminal 10, the CPU 1 determines in step S4 to transfer the data to the external device 8. When, in step S3, the CPU 1 detects that a low level voltage is supplied to the terminal 10, the CPU 1 determines in step S4 not to transfer the data to the external device 8. The relationship between the level of the voltage to be supplied and the determination of the data transfer to the external device 8 can be selected inversely.

Alternatively, in step S3, the CPU 1 may detect whether the specific transfer deletion terminal 10 is connected to another terminal (e.g., terminal 20) of the CPU 1 or not (e.g., connection shown by broken line 22). In this case, if the terminal is detected to be connected to the other terminal 20 in step S3, the CPU 1 may determine to transfer the data to the external device 8 in step S4, and vise versa.

Another case Is described where the prescribed portion whose state is detected in step S3 is a terminal 30 of the communication port 7 for connecting the electronic pocket organizer to the external device 8. In this case, if the CPU 1 detects in step S3 that the terminal 30 is connected to the external device 8, the CPU 1 determines in step S4 to transfer the data to the external device S. If the CPU 1 detects in step S3 that the terminal 30 is not connected to the external device 8, the CPU 1 may determine in step S4 not to transfer the data to the external device 8.

In the above embodiments, it is determined whether the data is to be transferred to the external device 8 or not, based on the internal state (e.g., terminal connections) of the portable terminal device. Accordingly, there is no case where the operation by the operator determines whether the data is to be transferred to the external device 8 or not.

Figure 3:
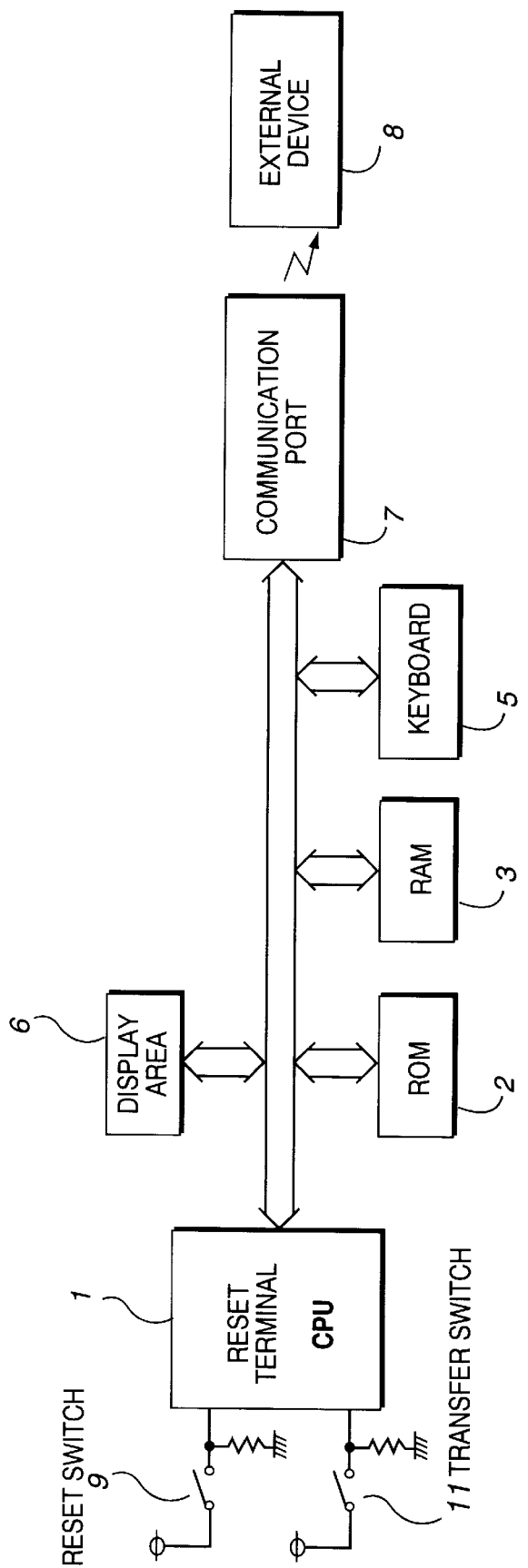
FIG. 3 is a block diagram showing the circuitry of another electronic pocket organizer according to the invention.

If it is desired that the operation by the operator can determine whether the data is to be transferred to the external device 8 or not, the portable terminal device is required to be provided with a transfer switch. The circuitry of this embodiment is shown in FIG. 3. FIG. 3 is the same as FIG. 1 except that a transfer switch 11 is provided. The operator can determine to transfer the data to the external device 8 by operating the transfer switch 11. The transfer switch 11 may be a slide switch whose on and off states can be previously set or a push-button switch which can be operated simultaneously with the reset switch 9 at the reset.

The former case where the transfer switch 11 is a slide switch is described. In FIG. 2, when the CPU 1 detects in step S3 that the slide switch is in the on state, the CPU 1 determines in step S4 to transfer the data to the external device 8. When the CPU 1 detects in step S3 that the slide switch is in the off state, the CPU 1 determines in step S4 not to transfer the data to the external device 8.

The latter case where the transfer switch 10 is a push-button switch is described. In FIG. 2, only when the CPU 1 detects in step S3 that the push-button switch is depressed simultaneously with the reset switch 9, will the CPU 1 determine in step S4 to transfer the data to the external device 8.

As described above, in step S4, if the CPU 1 determines to transfer the data to the external device 8, at least part of data stored in the RAM 3 is read out and transferred to the external device 8 via the communication part 7 in step S5. Thereafter, step S6 is implemented.

On the other hand, if the CPU 1 determines in step S4 not to transfer the data to the external device 8, the process proceeds to step S6 in which another process is implemented.

Figure 4:
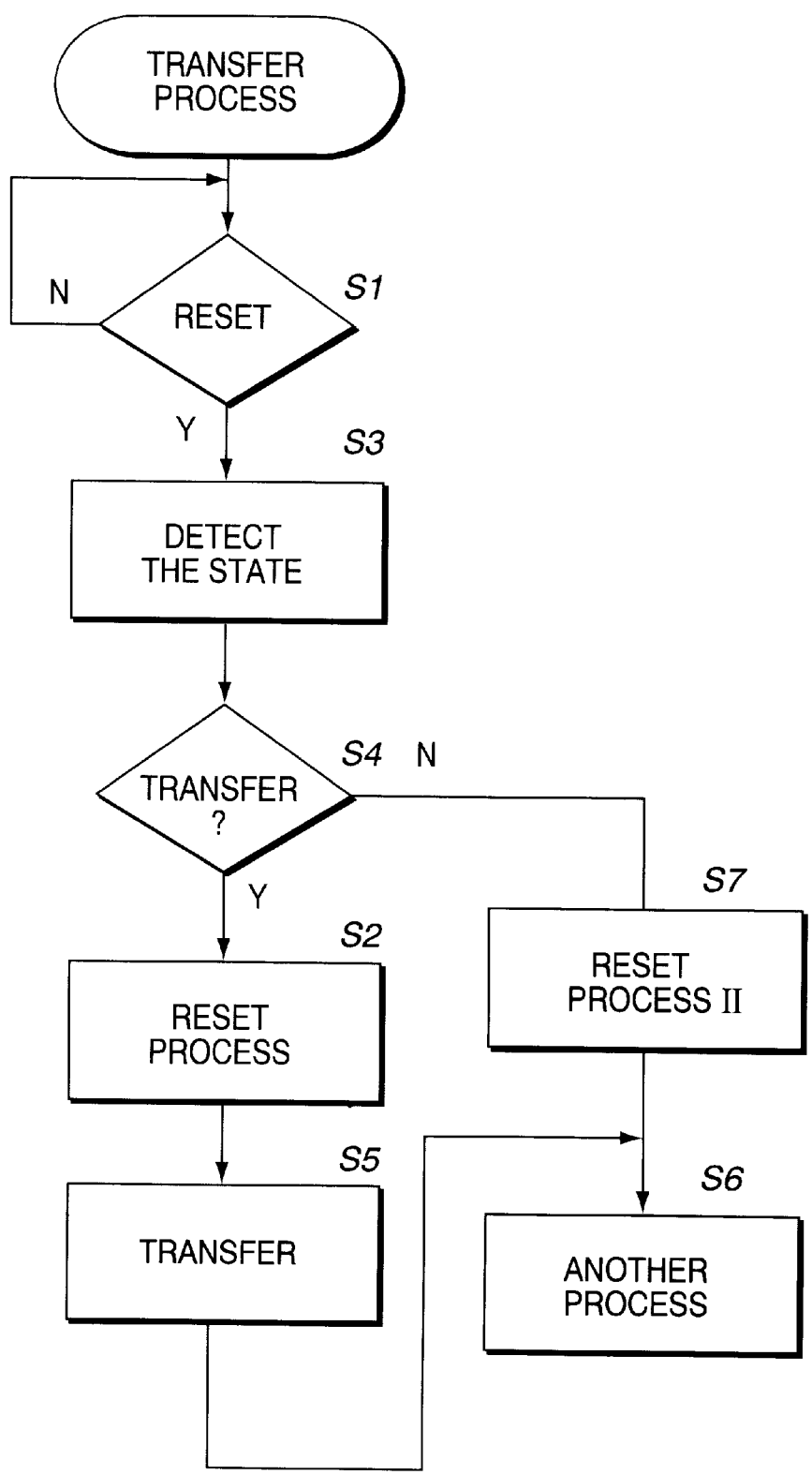
FIG. 4 is a flowchart illustrating another control procedure for a transfer process of the CPU.
Figure 5:
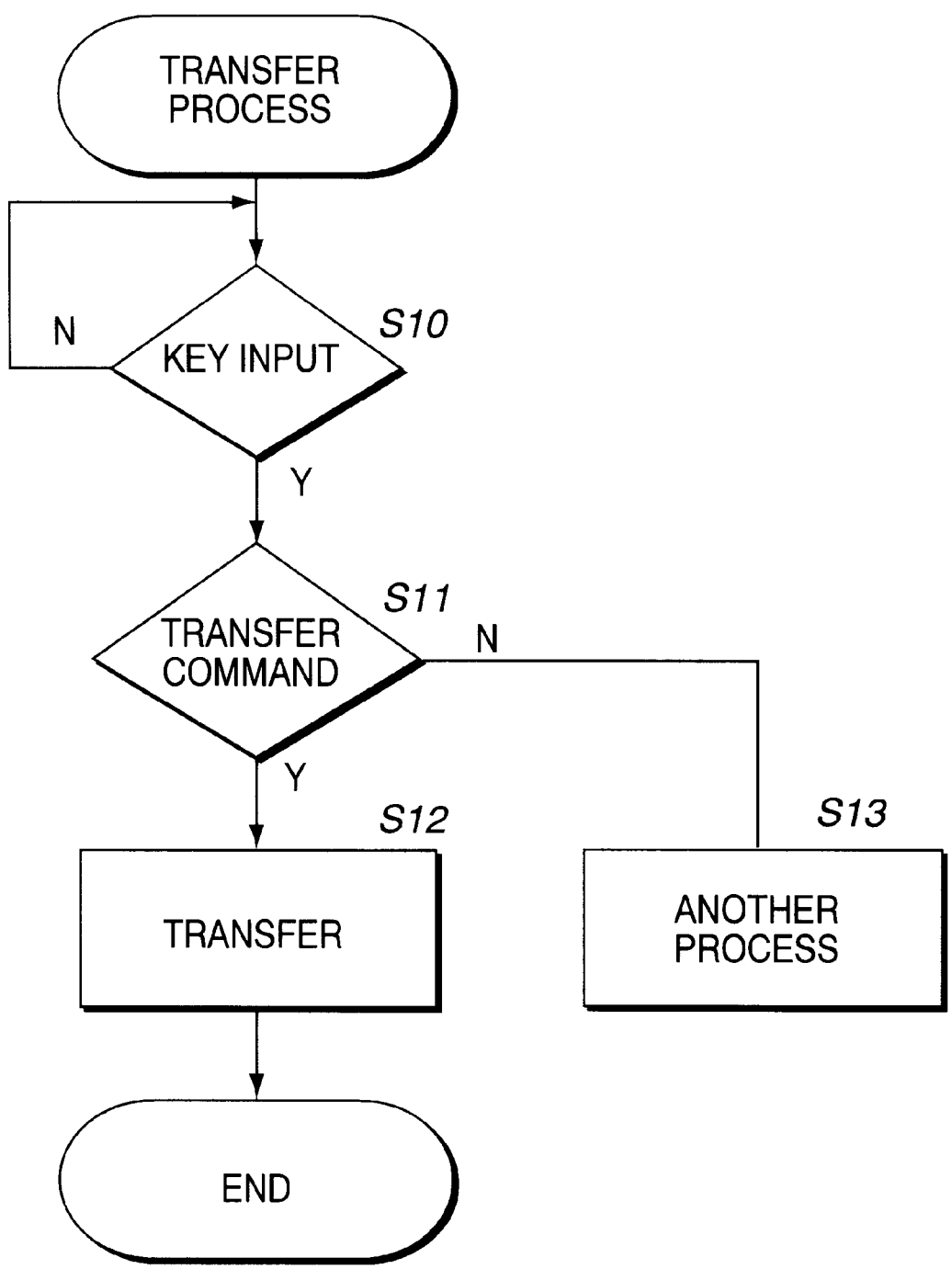
FIG. 5 is a flowchart illustrating a control procedure for a prior art transfer process.

In the above-mentioned embodiments, after the reset process (step S2), the determination process for determining whether the data is transferred or not (step S4) is implemented. Alternatively, after the determination process for determining whether or not the data is transferred is implemented, the reset process may be implemented depending on the result of the determination process. FIG. 4 shows the control procedure for the transfer process of the CPU 1 of this alternative case. In FIG. 4, steps S1, S3, and S4 are the same as those in FIG. 2 When the CPU 1 determines in step S4 to transfer the data to the external device 8, the CPU 1 executes steps S2, S5, and S6 sequentially. If the CPU 1 determines in step S4 not to transfer the data to the external device 8, the system area and data area in the RAM 3 are initialized in step S7. Thereafter, the process proceeds to step S6.

According to the above-mentioned control procedure, the data stored in the RAM 3 can directly be transferred to the external device 8 regardless of the quality of the data to be transferred. Therefore, even when a fault occurs in the key input portion of the keyboard 5 or even when an abnormality occurs such that part of the data in the RAM 3 is improperly rewritten, the data stored in the RAM 3 can directly be transferred to the external device 8.

The data which is transferred to the external device 8 is utilized in the following manner. When the external device 8 is another electronic pocket organizer and the data is normal, data which has been input into one electronic pocket organizer is copied to the other electronic pocket organizer. Therefore, the valuable data is available without a troublesome input process.

Even if the abnormal data such an the data improperly rewritten is transferred, the data is available without wasting the data. This is because the transferred abnormal data can be corrected by analyzing the contents of the data, after connecting the electronic pocket organizer to a development support device or a personal computer which has a check function on the contents of RAM (checksum, etc.) and a display function for the contents of RAM. Therefore, the input data is available.

It will be appreciated that the present invention can applied to various electronic devices other than an electronic pocket organizer.

As described above, according to the present invention, unlike the prior art, even when any fault occurs in the key input portion or any abnormality occurs in part of the data stored in the RAM, the data stored in the RAM can be directly transferred to an external device. Therefore, the valuable data which has been hard input can be efficiently utilized, and not rendered futile.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing one or more of the features of patentable novelty that reside in the present invention, including all features that would be treated as equivalents thereof by those skilled in the art to which this invention pertains.

What is claimed is:

1. A portable electronic data entry and storage device comprising:
   a RAM for storing data,
   a ROM for storing a transfer program for transferring at least part of the data stored in the RAM to an external device,
   a CPU for controlling the execution of the transfer program,
   a bus operated under control of the CPU for carrying the data stored in the RAM to the external device;
   a reset switch for initializing a system area in the RAM,
   wherein the CPU controls a detection process to detect a state of a prescribed terminal portion of the portable device when the reset switch is turned on and also determines whether or not the transfer program is to be executed based on the detected state, and
   wherein execution of the transfer program by the CPU causes data stored in the RAM to be applied via the bus to the external device.

2. A portable device according to claim 1, wherein the prescribed terminal portion is a terminal of the CPU, and the state to be detected is a level of voltage supplied to the terminal.

3. A portable device according to claim 1, wherein the prescribed terminal portion is a plurality of terminals of the CPU, and the state to be detected is whether the plurality of terminals of the CPU are connected together.

4. A portable device according to claim 1, further comprising a communication port for connecting the external device to the portable device, wherein the prescribed terminal portion is a terminal of the communication port, and the state to be detected is whether the external device is connected to the terminal of the communication port.

5. A portable device according to claim 1, further comprising a transfer switch, wherein the prescribed terminal portion is the transfer switch, and the state to be detected is an on/off state of the transfer switch.

6. A method of transferring data for a portable terminal device comprising a RAM for storing data, a ROM for storing a transfer program for transferring at least part of the data stored in the RAM to an external device, a CPU for controlling the execution of the transfer program, and a reset switch for initializing a system area in the RAM, the method comprising:
   detecting a state of a prescribed terminal portion of the portable terminal device when the reset switch is turned on,
   determining whether or not the transfer program is to be executed based on the detected state, and
   transferring at least a part of the data stored in the RAM via a bus to the external device when the transfer program is executed.

7. A method of transferring data according to claim 6, wherein the prescribed terminal portion is a terminal of the CPU, and the state to be detected is a level of the voltage supplied to the terminal.

8. A method of transferring data according to claim 6, wherein the prescribed terminal portion is a plurality of terminals of the CPU, and the state to be detected is whether the plurality of terminals of the CPU are connected together.

9. A method of transferring data according to claim 6, wherein the portable device further comprises a communication port for connecting the external device to the portable device, wherein the prescribed terminal portion is a terminal of the communication port, and the state to be detected is whether the external device is connected to the terminal of the communication port.

10. A method of transferring data according to claim 6, and wherein the prescribed terminal portion is the transfer switch, and the state to be detected is an on/off state of the transfer switch.

11. A portable electronic data entry and storage device comprising:
    a RAM for storing data;
    a reset switch;
    a ROM for storing a transfer program for transferring at least part of the data stored in the RAM to an external device;
    a terminal portion whereat a signal appears when data is to be transferred from the RAM to the external device;
    a CPU;
    bus operated under control of the CPU for carrying the data stored in the RAM to the external device;
    wherein the CPU executes the transfer program to transfer at least part of the data stored in the RAM, regardless of integrity of the data stored in the RAM, to the external device, a transfer occurring when both the reset switch is turned on and the signal appears at the terminal portion; and
    wherein execution of the transfer program by the CPU causes data stored in the RAM to be applied via the bus to the external device.

12. A portable device according to claim 11, wherein the terminal portion is a terminal of the CPU.

13. A portable device according to claim 11, wherein the terminal portion is a plurality of terminals of the CPU, and the signal indicates that the plurality of terminals of the CPU are connected together.

14. A portable device according to claim 11, further comprising a communication port for connecting the external device to the portable device, wherein the terminal portion is a terminal of the communication port.

15. A portable device according to claim 11, further comprising a transfer switch, wherein the terminal portion is the transfer switch.

* * * * *